US012591272B2

(12) United States Patent
Zhang et al.

(10) Patent No.: US 12,591,272 B2
(45) Date of Patent: Mar. 31, 2026

(54) HINGE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Jun Zhang, Beijing (CN); Chuankun You, Beijing (CN); Fengping Wu, Beijing (CN); Wei Qing, Beijing (CN); Zhihui Wang, Beijing (CN); Jia Zeng, Beijing (CN); Lei Zhang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 356 days.

(21) Appl. No.: 18/025,647

(22) PCT Filed: Feb. 22, 2022

(86) PCT No.: PCT/CN2022/077265
§ 371 (c)(1),
(2) Date: Mar. 10, 2023

(87) PCT Pub. No.: WO2023/159348
PCT Pub. Date: Aug. 31, 2023

(65) Prior Publication Data
US 2024/0288903 A1 Aug. 29, 2024

(51) Int. Cl.
*G06F 1/16* (2006.01)
*H04M 1/02* (2006.01)

(52) U.S. Cl.
CPC .......... *G06F 1/1652* (2013.01); *G06F 1/1681* (2013.01); *H04M 1/022* (2013.01); *H04M 1/0268* (2013.01)

(58) Field of Classification Search
CPC .... G06F 1/1681; G06F 1/1652; H04M 1/022; H04M 1/0268
See application file for complete search history.

(56) References Cited

U.S. PATENT DOCUMENTS 10,761,574 B1 * 9/2020 Hsu ........................ G06F 1/1616
10,824,197 B1 * 11/2020 Hsu ........................ G06F 1/1641
(Continued)

FOREIGN PATENT DOCUMENTS

CN 108291640 A 7/2018
CN 108322567 A 7/2018
(Continued)

*Primary Examiner* — Nidhi Thaker
(74) *Attorney, Agent, or Firm* — XSENSUS LLP

(57) ABSTRACT

Provided is a hinge. The hinge includes: a support base and at least one set of flip assemblies. One set of flip assemblies include a first flip assembly and a second flip assembly that are symmetrically arranged with respect to the support base. The first flip assembly includes a first swing arm and a first flip plate. A first end of the first swing arm is flipably connected to the support base, and a second end of the first swing arm is flipably connected to a rear face of the first flip plate. The second flip assembly includes a second swing arm and a second flip plate. A first end of the second swing arm is flipably connected to the support base, and a second end of the second swing arm is flipably connected to a rear face of the second flip plate.

20 Claims, 7 Drawing Sheets

(56) References Cited

U.S. PATENT DOCUMENTS

| | | | | |
|---|---|---|---|---|
| 11,089,695 | B2 | 8/2021 | Park | |
| 2018/0372090 | A1 | 12/2018 | Van Der Blom | |
| 2021/0044682 | A1* | 2/2021 | Liu | G06F 1/1652 |
| 2021/0181808 | A1* | 6/2021 | Liao | H04M 1/0216 |
| 2021/0243908 | A1* | 8/2021 | Park | G06F 1/1616 |
| 2021/0325941 | A1 | 10/2021 | Hou et al. | |
| 2022/0004232 | A1* | 1/2022 | Wu | G06F 1/1652 |
| 2022/0104370 | A1* | 3/2022 | Wu | G06F 1/1681 |
| 2022/0137676 | A1* | 5/2022 | Tian | G06F 1/1616 |
| | | | | 361/679.27 |
| 2022/0217228 | A1* | 7/2022 | Hu | G06F 1/1652 |
| 2022/0377919 | A1* | 11/2022 | Zhang | H04M 1/022 |
| 2023/0409090 | A1* | 12/2023 | Hong | G06F 1/1616 |
| 2024/0183383 | A1* | 6/2024 | Ying-Hsing | G06F 1/1641 |

FOREIGN PATENT DOCUMENTS

| | | | | | |
|---|---|---|---|---|---|
| CN | 110010008 | A | | 7/2019 | |
| CN | 110162141 | A | | 8/2019 | |
| CN | 110273915 | A | | 9/2019 | |
| CN | 110825173 | A | | 2/2020 | |
| CN | 111692199 | A | | 9/2020 | |
| CN | 212643303 | U | | 3/2021 | |
| CN | 112648279 | A | | 4/2021 | |
| CN | 112901643 | A | | 6/2021 | |
| CN | 112995368 | A | | 6/2021 | |
| CN | 113053238 | A | | 6/2021 | |
| CN | 113194167 | A | | 7/2021 | |
| CN | 113404767 | A | | 9/2021 | |
| CN | 113719525 | A | * | 11/2021 | F16C 11/12 |
| CN | 113873059 | A | | 12/2021 | |
| CN | 113915229 | A | | 1/2022 | |

* cited by examiner

HINGE AND DISPLAY DEVICE

CROSS-REFERENCE TO RELATED APPLICATION

This application is a U.S. national stage of international application No. PCT/CN2022/077265, filed on Feb. 22, 2022, the disclosure of which is herein incorporated by reference in its entirety.

TECHNICAL FIELD

The present disclosure relates to the field of electronic devices, and in particular, relates to a hinge and a display device.

BACKGROUND OF THE INVENTION

With the development of the display technologies, more and more display devices are disposed with foldable display screens. The display device disposed with the foldable display screen can switch a physics dimension of the display device, which greatly improves use experience of users.

SUMMARY OF THE INVENTION

Embodiments of the present disclosure provide a hinge and a display device. The technical solutions are as follows.

In some embodiments of the present disclosure, a hinge is provided. The hinge includes:

a support base and at least one set of flip assemblies, wherein one set of flip assemblies include a first flip assembly and a second flip assembly that are symmetrically arranged with respect to the support base; wherein the first flip assembly includes a first swing arm and a first flip plate, wherein a first end of the first swing arm is flipably connected to the support base, and a second end of the first swing arm is flipably connected to a rear face of the first flip plate; and the second flip assembly includes a second swing arm and a second flip plate, wherein a first end of the second swing arm is flipably connected to the support base, and a second end of the second swing arm is flipably connected to a rear face of the second flip plate;

wherein a front face of the first flip plate is coplanar with a front face of the second flip plate in the case that the hinge is in an unfolded state, and the front face of the first flip plate is opposite and parallel to the front face of the second flip plate in the case that the hinge is in a folded state;

and in the case that the hinge is switched between the unfolded state and the folded state, the first flip plate flips about the support base through the first swing arm, the first flip plate is swingable about the second end of the first swing arm, the second flip plate flips about the support base through the second swing arm, and the second flip plate is swingable about the second end of the second swing arm.

In some embodiments, a maximum angle of the first flip plate swinging about the second end of the first swing arm and a maximum angle of the second flip plate swinging about the second end of the second swing arm both range from 6 degrees to 13 degrees.

In some embodiments, the rear face of the first flip plate is provided with a first connector having a first through hole therein, and the second end of the first swing arm is provided with a first pin shaft, wherein a portion of the first pin shaft is within the first through hole and is rotatably connected to the first connector; and the rear face of the second flip plate is provided with a second connector having a second through hole therein, and the second end of the second swing arm is provided with a second pin shaft, wherein a portion of the second pin shaft is within the second through hole and is rotatably connected to the second connector.

In some embodiments, the support base includes: a first support, wherein the first support is provided with a first arc slide slot and a second arc slide slot, wherein the first end of the first swing arm is provided with a first arc rail, wherein the first arc rail is within the first arc slide slot and is rotatably connected to the first support; and the first end of the second swing arm is provided with a second arc rail, wherein the second arc rail is within the second arc slide slot and is rotatably connected to the first support.

In some embodiments, the one set of flip assemblies further include a press plate, wherein the press plat is fixedly connected to a side, on which the first arc slide slot and the second arc slide slot are disposed, of the first support, and a face, facing away from the first support, of the press plate is coplanar with the front face of the first flip plate and the front face of the second flip plate in the case that the hinge is in the unfolded state.

In some embodiments, the hinge further includes: at least one set of synchronization assemblies, wherein one set of synchronization assemblies include a first synchronization assembly and a second synchronization assembly that are symmetrically arranged with respect to the support base; wherein the first synchronization assembly is connected to the first flip assembly, the second synchronization assembly is connected to the second flip assembly, the first synchronization assembly is connected to the second synchronization assembly, and the first synchronization assembly and the second synchronization assembly are configured to drive the first flip assembly and the second flip assembly to flip synchronously.

In some embodiments, the first synchronization assembly includes: a first connection rod, a first drive synchronization shaft, and a first drive gear, wherein a first end of the first connection rod is slidably connected to the first flip plate, a second end of the first connection rod is fixedly connected to the first drive synchronization shaft, the first drive gear is sleeved on the first drive synchronization shaft and is fixedly connected to the first drive synchronization shaft, and the first drive synchronization shaft is further rotatably connected to the support base; and the second synchronization assembly includes: a second connection rod, a second drive synchronization shaft, and a second drive gear, wherein a first end of the second connection rod is slidably connected to the second flip plate, a second end of the second connection rod is fixedly connected to the second drive synchronization shaft, the second drive gear is sleeved on the second drive synchronization shaft and is fixedly connected to the second drive synchronization shaft, and the second drive synchronization shaft is further rotatably connected to the support base;

wherein the first drive gear is engaged with the second drive gear.

In some embodiments, the rear face of the first flip plate is provided with a first slide member, wherein the first slide member has a slide slot therein, the first connection rod being in clearance fit with the slide slot; and the rear face of the second flip plate is provided with a second slide member, wherein the second slide member has a slide slot therein, the second connection rod being in clearance fit with the slide slot.

In some embodiments, the one set of synchronization assemblies further include a plurality of driven gears disposed between the first drive gear and the second drive gear, wherein a number of the plurality of driven gears is an even number, the plurality of driven gears are sequentially engaged, and the plurality of driven gears are respectively engaged with the first drive gear and the second drive gear.

In some embodiments, the support base further includes: a second support provided with a third through hole and a fourth through hole, wherein the first drive synchronization shaft passes through the third through hole, is disposed on an end portion outside the second support, and is fixedly connected to the first connection rod; and the second drive synchronization shaft passes through the fourth through hole, is disposed on an end portion outside the second support, and is fixedly connected to the second connection rod.

In some embodiments, the hinge includes at least two sets of synchronization assemblies, wherein the at least two sets of synchronization assemblies are in one to one correspondence to the at least one set of flip assemblies, and two sets of synchronization assemblies corresponding to one set of flip assemblies are respectively disposed on two sides of the one set of flip assemblies.

In some embodiments, the hinge further includes at least one set of torsion assemblies, wherein the at least one set of torsion assemblies are in one to one correspondence to the at least one set of synchronization assemblies, and one set of torsion assemblies include a first torsion assembly and a second torsion assembly that are respectively connected to the first drive synchronization shaft and the second drive synchronization shaft in corresponding one set of synchronization assemblies, wherein the first torsion assembly and the second torsion assembly are configured to provide a damping force in the case that the first flip assembly and the second flip assembly flip.

In some embodiments, the first torsion assembly is disposed on a side, facing away from the first connection rod, of the first drive gear, and the first torsion assembly includes a first movable cam, a first fixed cam, a first elastic member, and a first lock member that are sleeved on the first drive synchronization shaft, wherein the first movable cam is fixedly connected to the first drive synchronization shaft, the first fixed cam is disposed on a side, facing away from the first drive gear, of the first movable cam and is rotatably connected to the first drive synchronization shaft, the first lock member is disposed on a side, facing away from the first movable cam, of the first fixed cam and is fixedly connected to the first drive synchronization shaft, and the first elastic member is disposed between the first fixed cam and the first lock member; and the second torsion assembly is disposed on a side, facing away from the second connection rod, of the second drive gear, and the second torsion assembly includes a second movable cam, a second fixed cam, a second elastic member, and a second lock member that are sleeved on the second drive synchronization shaft, wherein the second movable cam is fixedly connected to the second drive synchronization shaft, the second fixed cam is disposed on a side, facing away from the second drive gear, of the second movable cam and is rotatably connected to the second drive synchronization shaft, the second lock member is disposed on a side, facing away from the second movable cam, of the second fixed cam and is fixedly connected to the second drive synchronization shaft, and the second elastic member is disposed between the second fixed cam and the second lock member;

wherein the first fixed cam is fixedly connected to the second fixed cam.

In some embodiments, each of the first elastic member and the second elastic member includes a plurality of stacked disc springs.

In some embodiments, the hinge includes two sets of synchronization assemblies, wherein the two sets of synchronization assemblies are uniformly arranged in a length direction of the support base.

In some embodiments of the present disclosure, a display device is provided. The display device includes:

a housing, a flexible screen, and a hinge, wherein the hinge is within the housing, an edge of the flexible screen is connected to an edge of the housing, and a rear face of the flexible screen is fitted with a front face of the first flip plate of the hinge and a front face of the second flip plate of the hinge. The hinge is any one of above hinge.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION OF THE INVENTION

To make the objectives, technical solutions, and advantages of the present disclosure clearer, the embodiments of the present disclosure are further described in detail hereinafter with reference to the accompanying drawings.

Nowadays, the display device disposed with the foldable display screen includes: a housing, a flexible screen, and a hinge configured to fold the flexible screen. The hinge is fixed within the housing, an edge of the flexible screen is connected to an edge of the housing, such that the housing supports the flexible screen. In the case that the hinge flips, the flexible screen is driven to be folded or unfolded through the housing, and the display device is eventually in a folded state or an unfolded state.

However, in folding or unfolding the display device through the hinges, the flexible screen is prone to being squeezed or pulled, such that the flexible screen is prone to damage after multiple folding, and a service life of the flexible screen is reduced.

In the embodiments of the present disclosure, the provided hinge is applicable to a foldable display device, and under different use requirements, users fold or unfold the foldable display device to meet different requirements of the users. For example, in the case that the user needs to carry around the foldable display device, the foldable display device is folded, so as to reduce bulk and improve a portability; in the case that the user uses the foldable display device, the foldable display device is unfolded, so as to provide a larger display region and operation region and improve a use convenience. In practical use, the foldable display devices are classified as a plurality of types, for example, mobile phones, tablet personal computers, laptop computers, e-books, and the like.

Taking the mobile phone as an example, the mobile phone includes a first housing and a second housing connected by a hinge, and the first housing and the second housing are flipable relative to each other. The flexible screen is disposed on surfaces of the first housing and the second housing. In the case that the mobile phone is unfolded, the flexible screen provides a larger display area and operation region, so as to improve the use property. In the case that the mobile phone is folded, the flexible screen is wrapped between the first housing, the hinge, and the second housing, so as to greatly protect the flexible screen, avoid the damage of the flexible screen under an action of an external force, and improve a safety property of the mobile phone. The following embodiments illustrates a structure of the hinge in the foldable display device in detail.

Figure 1:
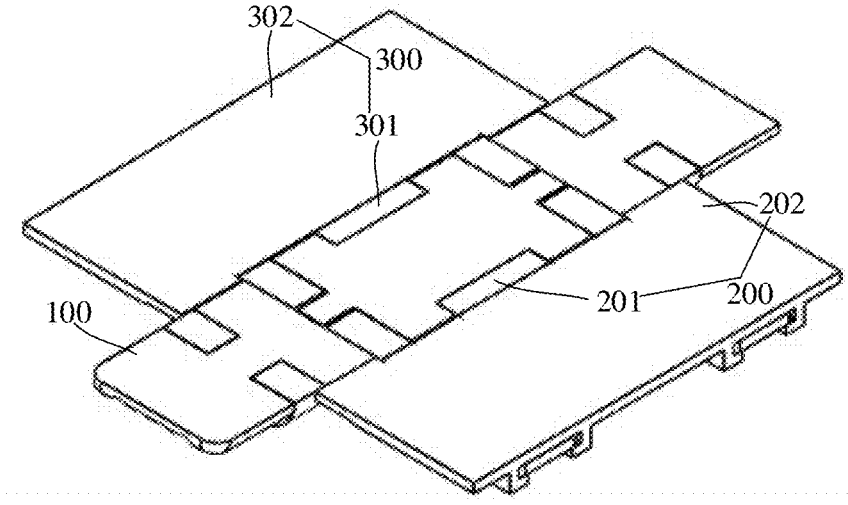
FIG. 1 is a schematic structural diagram of a hinge according to some embodiments of the present disclosure.
Figure 2:
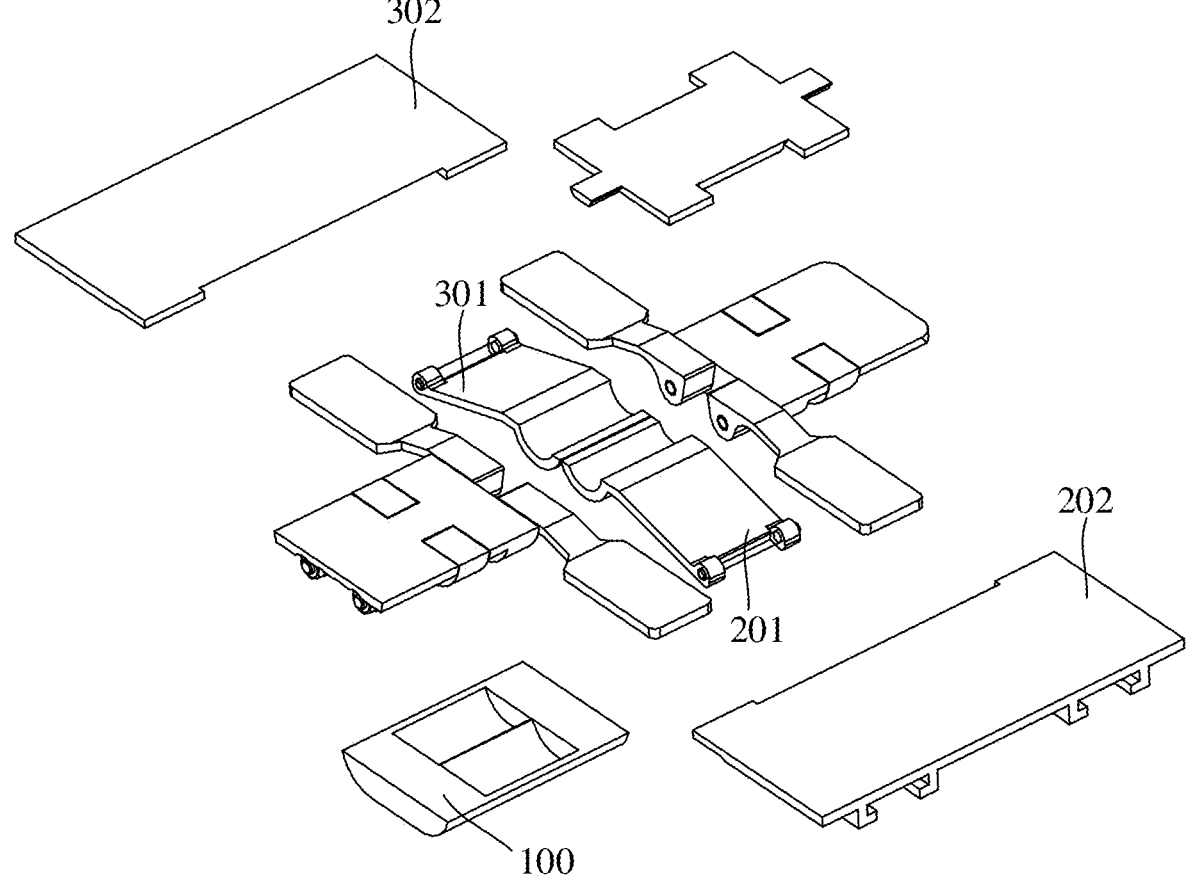
FIG. 2 is an explosive diagram of the hinge shown in FIG. 1.

Referring to FIG. 1 and FIG. 2, FIG. 1 is a schematic structural diagram of a hinge according to some embodiments of the present disclosure, and FIG. 2 is an explosive diagram of the hinge shown in FIG. 1. The hinge includes a support base 100 and at least one set of flip assemblies. One set of flip assemblies include a first flip assembly 200 and a second flip assembly 300 that are symmetrically arranged with respect to the support base 100. The first flip assembly 200 and the second flip assembly 300 are flipable towards or facing away from the support base 100, such that a folding or unfolding function of the hinge is achieved.

The first flip assembly 200 in the hinge includes a first swing arm 201 and a first flip plate 202. A first end of the first swing arm 201 is flipably connected to the support base 100, and a second end of the first swing arm 201 is flipably connected to a rear face of the first flip plate 202. The second flip assembly 300 in the hinge includes a second swing arm 301 and a second flip plate 302. A first end of the second swing arm 301 is flipably connected to the support base 100, and a second end of the second swing arm 301 is flipably connected to a rear face of the second flip plate 302.

Figure 3:
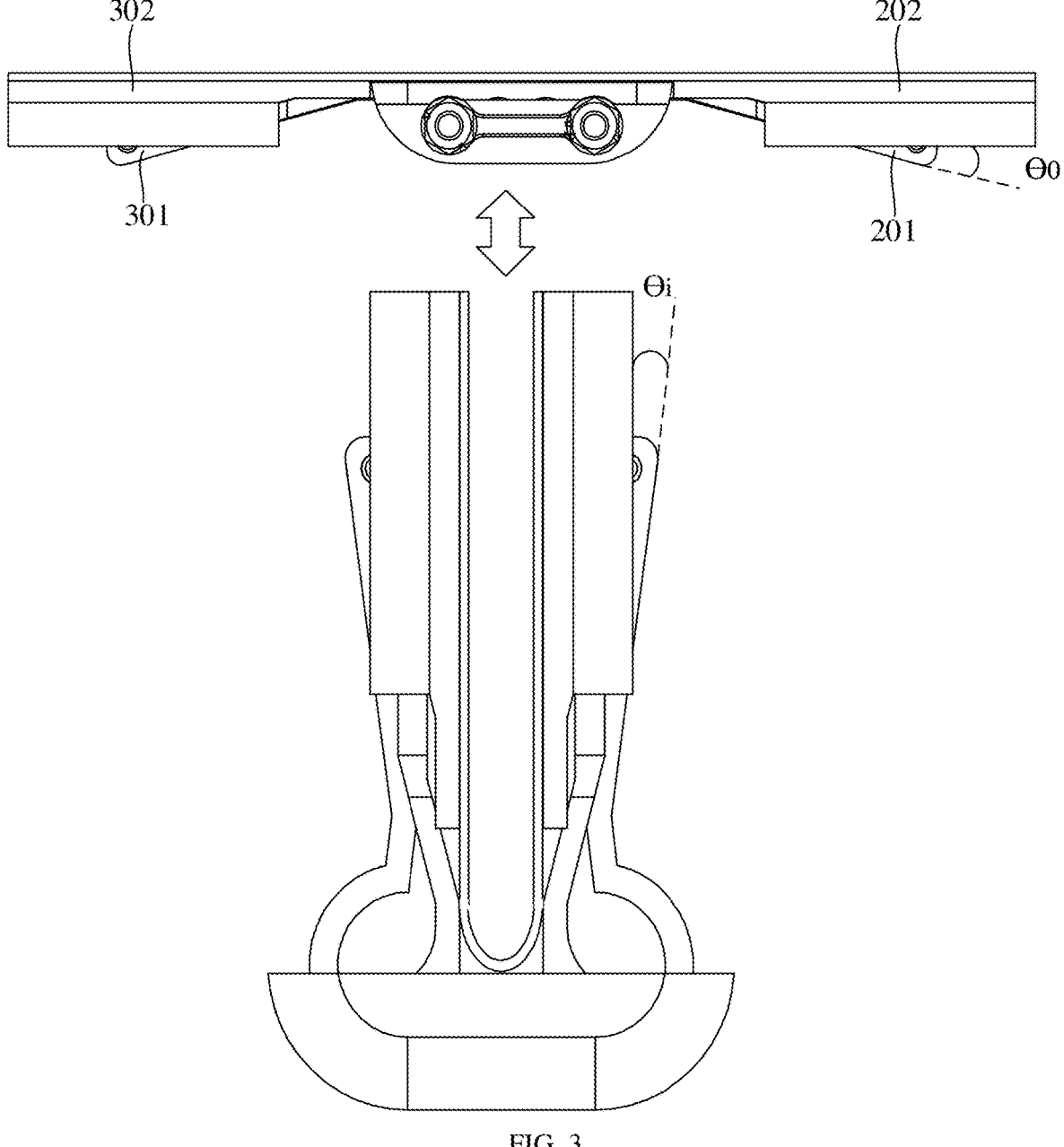
FIG. 3 is a schematic diagram of switching a hinge between an unfolded state and a folded state according to some embodiments of the present disclosure.

Referring to FIG. 3, FIG. 3 is a schematic diagram of switching a hinge between an unfolded state and a folded state according to some embodiments of the present disclosure. A front face of the first flip plate 202 in the first flip assembly 200 is coplanar with a front face of the second flip plate 302 in the case that the hinge is in an unfolded state, and the front face of the first flip plate 202 in the first flip assembly 200 is opposite and parallel to the front face of the second flip plate 302 in the case that the hinge is in a folded state. In the case that the hinge is switched between the unfolded state and the folded state, the first flip plate 202 flips about the support base 100 in the hinge through the first swing arm 201, the first flip plate 202 is swingable about the second end of the first swing arm 201, the second flip plate 302 flips about the support base 100 through the second swing arm 301, and the second flip plate 302 is swingable about the second end of the second swing arm 301. In the present disclosure, a maximum angle of the first flip plate 202 swinging about the second end of the first swing arm 201 ranges from 6 degrees to 13 degrees, and a maximum angle of the second flip plate 302 swinging about the second end of the second swing arm 301 also ranges from 6 degrees to 13 degrees.

Figures 4, 5:
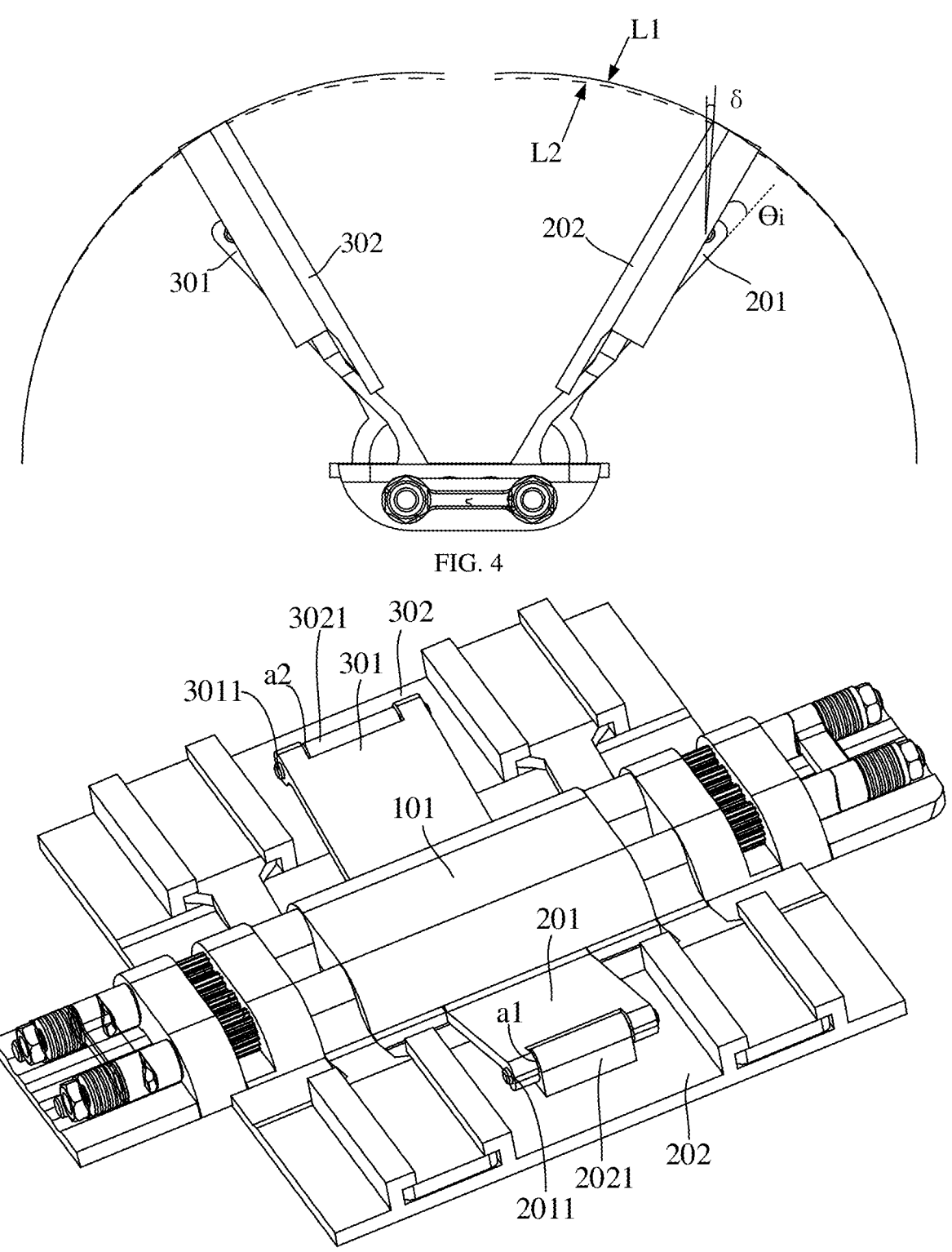
FIG. 4 is a schematic diagram of a change of an included angle between a rear face of a first flip plate and a length direction of a first swing arm according to some embodiments of the present disclosure.
FIG. 5 is a schematic structural diagram of another hinge according to some embodiments of the present disclosure.

In some embodiments, in the case that the hinge is switched from the unfolded state to the folded state, the first flip plate 202 flips in a counterclockwise direction under the action of the external force. In this case, the first flip plate 202 drives the first swing arm 201 to flip in the counterclockwise direction. In flipping, the first flip plate 202 is swingable about the second end of the first swing arm 201, such that an included angle between the rear face of the first flip plate 202 and a length direction of the first swing arm 201 changes. In the present disclosure, referring to FIG. 4, FIG. 4 is a schematic diagram of a change of an included angle between a rear face of a first flip plate and a length direction of a first swing arm according to some embodiments of the present disclosure. In FIG. 4, a curve L2 represents a movement trajectory of an edge of the hinge in some practice, and the trajectory line is an arc trajectory. As a relative swing angle between the first flip plate 202 and the first swing arm 201 is 8 in the case that the hinge flips to a random position in the present disclosure, that is, a movement trajectory of an edge of the hinge in the present disclosure is a curve L1 that is not an arc, the included angle between the rear face of the first flip plate 202 and the first swing arm 201 is gradually reduced in the case that the hinge is switched from the unfolded state to the folded state, that is, a value of the included angle $\theta 0$ between the rear face of the first flip plate 202 and the first swing arm 201 in the unfolded state is greater than a value of the included angle $\theta i$ between the rear face of the first flip plate 202 and the first swing arm 201 in the folded state, such that a connection rod mechanism formed by the first flip plate 202 and the first swing arm 201 is stretchable. As such, the hinge basically does not squeeze the flexible screen in the display device in folding, such that a possibility of damaging the flexible screen by the hinge after multiple folding of the flexible screen is reduced. In addition, as the front face of the first flip plate 202 in the first flip assembly 200 is opposite and parallel to the front face of the second flip plate 302 in the case that the hinge is in the folded state, the first flip plate 202 and the second flip plate 302 do not pressed the flexible screen. In this case, the hinge is U-shaped, and is also referred to as a U-shaped hinge.

In the case that the hinge is switched from the folded state to the unfolded state, the first flip plate 202 flips in a clockwise direction under the action of the external force. In this case, the first flip plate 202 drives the first swing arm 201 to flip in the clockwise direction. In flipping, the first flip plate 202 is swingable about the second end of the first swing arm 201, such that an included angle between the rear face of the first flip plate 202 and the length direction of the first swing arm 201 changes. In the present disclosure, the included angle between the rear face of the first flip plate 202 and the first swing arm 201 is gradually increased in the case that the hinge is switched from the folded state to the unfolded state, that is, the value of the included angle θi between the rear face of the first flip plate 202 and the first swing arm 201 in the folded state is less than the value of the included angle θ0 between the rear face of the first flip plate 202 and the first swing arm 201 in the unfolded state, such that a length of the connection rod mechanism formed by the first flip plate 202 and the first swing arm 201 can be shorten. As such, the hinge basically does not squeeze the flexible screen in the display device in unfolding, such that a possibility of damaging the flexible screen by the hinge after multiple unfolding of the flexible screen is reduced. In addition, as the front face of the first flip plate 202 in the first flip assembly 200 is coplanar with the front face of the second flip plate 302 in the case that the hinge is unfolded in an eventual state (that is, the included angle between the first flip plate 202 and the second flip plate 302 is 180 degrees), that is, the first flip plate 202 and the second flip plate 302 form a flat support face. Thus, the flexible screen is provided with a great support.

It should be noted that the first flip assembly 200 and the second flip assembly 300 are symmetrically arranged with respect to the support base 100, and a basic structure and composition and a movement principle of the second flip assembly 300 are the same as that of the first flip assembly 200. Thus, in the embodiments of the present disclosure, the structure and composition and the movement principle of the second flip assembly 300 are referred to the description of the first flip assembly 200, which are not repeated.

In summary, a hinge is provided in the embodiments of the present disclosure. The hinge includes: a support base and at least one set of flip assemblies. One set of flip assemblies include a first flip assembly and a second flip assembly that are symmetrically arranged with respect to the support base. In the case that the hinge is switched between the unfolded state and the folded state, a first flip plate is swingable around a second end of a first swing arm in flipping, such that an included angle between a rear face of the first flip plate and the first swing arm changes, and a length of a connection rod mechanism formed by the first flip plate and the first swing arm is extended or shortened with the change of the included angle between the rear face of the first flip plate and the first swing arm. Thus, in folding the flexible screen of the display device, the hinge basically does not squeeze or pull the flexible screen, such that a possibility of damaging the flexible screen by the hinge is reduced, and the service life of the flexible screen is effectively prolonged.

The following describes the connection structure between the members in the first flip assembly 200, the connection structure of the members and the support base 100, and the movement principle of the first flip assembly 200 in detail, and the connection structure between the members in the second flip assembly 300 and the movement principle of the second flip assembly 300 are referred to the description of the first flip assembly 200.

Figures 6, 7:
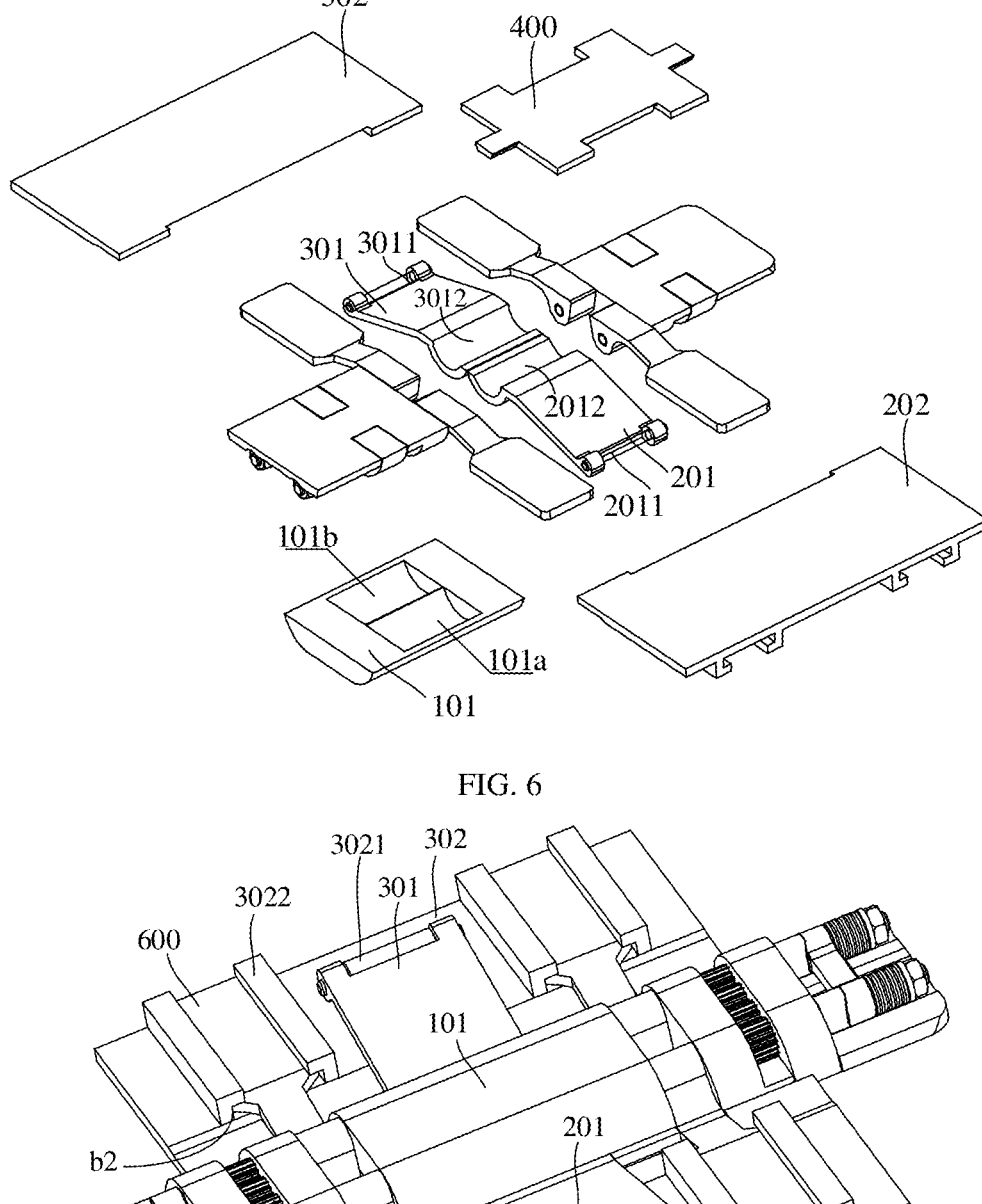
FIG. 6 is an explosive diagram of the hinge shown in FIG. 5.
FIG. 7 is a schematic structural diagram of another hinge according to some embodiments of the present disclosure.

In some embodiments, referring to FIG. 5 and FIG. 6, FIG. 5 is a schematic structural diagram of another hinge according to some embodiments of the present disclosure, and FIG. 6 is an explosive diagram of the hinge shown in FIG. 5. The rear face of the first flip plate 202 in the first flip assembly 200 is provided with a first connector 2021 having a first through hole a1 therein, and the second end of the first swing arm 201 is provided with a first pin shaft 2011. A portion of the first pin shaft 2011 is within the first through hole a1 and is rotatably connected to the first connector 2021. The rear face of the second flip plate 302 in the second flip assembly 300 is provided with a second connector 3021 having a second through hole a2 therein, and the second end of the second swing arm 301 is provided with a second pin shaft 3011. A portion of the second pin shaft 3011 is within the second through hole a2 and is rotatably connected to the second connector 3021. In this case, the first swing arm 201 is flipably connected to the first flip plate 202 by the rotatable connection of the first pin shaft 2011 to the first through hole a1, and the second swing arm 301 is flipably connected to the second flip plate 302 by the rotatable connection of the second pin shaft 3011 to the second through hole a2.

In some embodiments of the present disclosure, as shown in FIG. 6, a mode of flipable connection of the first swing arm 201 to the support base 100 and a mode of flipable connection of the second swing arm 301 to the support base 100 are a virtue axis. For example, the support base 100 in the hinge includes a first support 101. The first support 101 is provided with a first arc slide slot 101*a* and a second arc slide slot 101*b*. The first end of the first swing arm 201 in the first flip assembly 200 is provided with a first arc rail 2012. The first arc rail 2012 is within the first arc slide slot 101*a* and is rotatably connected to the first support 101. The first end of the second swing arm 301 in the second flip assembly 300 is provided with a second arc rail 3012. The second arc rail 3012 is within the second arc slide slot 101*b* and is rotatably connected to the first support 101. In this case, the first arc rail 2012 is within the first arc slide slot 101*a*, such that the first swing arm 201 is flipably connected to the first support 101 in the support base 100; the second arc rail 3012 is within the second arc slide slot 101*b*, such that the second swing arm 301 is flipably connected to the first support 101 in the support base 100. In addition, the first arc rail 2012 and the second arc rail 3012 are well hidden to avoid being exposed through the connection mode of the virtual axis, such that the integrity of the appearance of the hinge is improved. It should be noted that in some embodiments, the first swing arm 201 and the first support 101, and the second swing arm 301 and the first support 101 are respectively flipably connected by a pin shaft or other mode, which are not limited in the embodiments of the present disclosure.

In some embodiments, as shown in FIG. 6, the one set of flip assemblies in the hinge further include a press plate 400. The press plat 400 is fixedly connected to a side, on which the first arc slide slot 101*a* and the second arc slide slot 101*b* are disposed, of the first support 101, and a face, facing away from the first support 101, of the press plate 400 is coplanar with the front face of the first flip plate 202 and the front face of the second flip plate 302 in the case that the hinge is in the unfolded state. In this case, the first arc rail 2012 is defined within the first arc slide slot 101*a* by the press plate

400, and the second arc rail 3012 is defined within the second arc slide slot 101*b* by the press plate 400, such that a stable connection of the first arc rail 2012 to the first arc slide slot 101*a* and a stable connection of the second arc rail 3012 to the second arc slide slot 101*b* are achieved. In addition, in the case that the hinge is unfolded to the eventual state, the first flip plate 202, the press plate 400, and the second flip plate 302 form a flat support face. As such, the flexible screen in the display device is provided with a great support.

Figure 8:
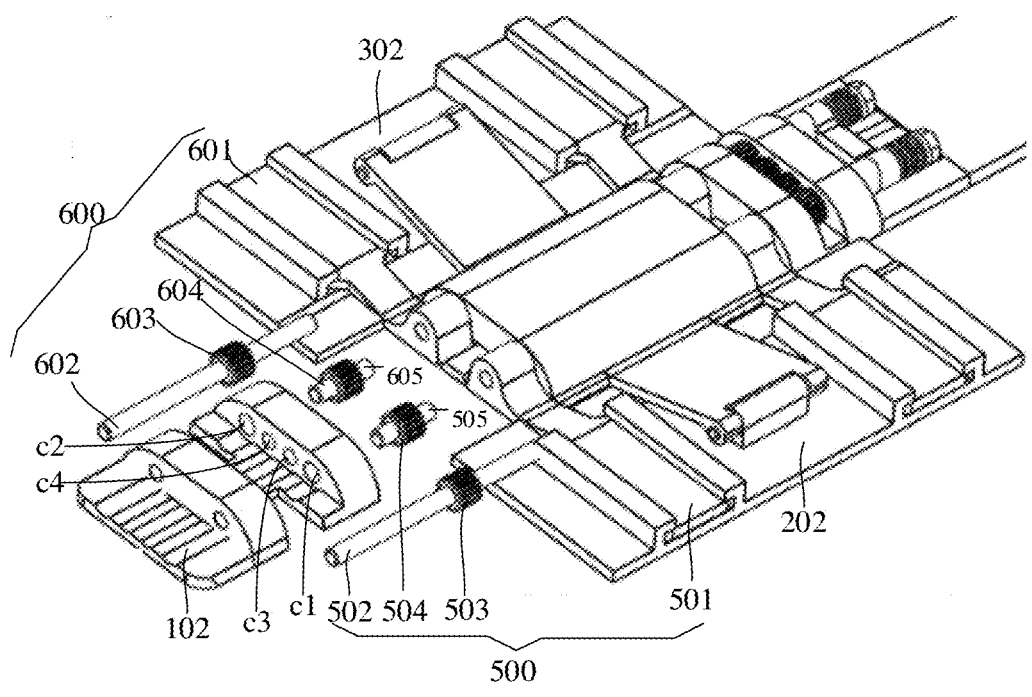
FIG. 8 is an explosive diagram of the hinge shown in FIG. 7.

To ensure the synchronous movement of the first flip assembly 200 and the second flip assembly 300 in one set of flip assemblies in folding or unfolding the hinge, a synchronization assembly capable of achieving synchronous flip of the first flip assembly 200 and the second flip assembly 300 towards or facing away from each other is provided in the present disclosure. Referring to FIG. 7 and FIG. 8, FIG. 7 is a schematic structural diagram of another hinge according to some embodiments of the present disclosure, and FIG. 8 is an explosive diagram of the hinge shown in FIG. 7. The hinge further includes: at least one set of synchronization assemblies. One set of synchronization assemblies include a first synchronization assembly 500 and a second synchronization assembly 600 that are symmetrically arranged with respect to the support base 100. The first synchronization assembly 500 is connected to the first flip assembly 200, the second synchronization assembly 600 is connected to the second flip assembly 300, the first synchronization assembly 500 is connected to the second synchronization assembly 600, and the first synchronization assembly 500 and the second synchronization assembly 600 are configured to drive the first flip assembly 200 and the second flip assembly 300 to flip synchronously. In this case, the synchronous flip of the first flip assembly 200 and the second flip assembly 300 is achieved by the connection of the first synchronization assembly 500 to the first flip assembly 200 and the connection of the second synchronization assembly 600 and the second flip assembly 300, thereby improving the use experience of the user.

In some embodiments, the first synchronization assembly 500 includes: a first connection rod 501, a first drive synchronization shaft 502, and a first drive gear 503. A first end of the first connection rod 501 is slidably connected to the first flip plate 202, a second end of the first connection rod 501 is fixedly connected to the first drive synchronization shaft 502, the first drive gear 503 is sleeved on the first drive synchronization shaft 502 and is fixedly connected to the first drive synchronization shaft 502, and the first drive synchronization shaft 502 is further rotatably connected to the support base 100. The second synchronization assembly 600 includes: a second connection rod 601, a second drive synchronization shaft 602, and a second drive gear 603. A first end of the second connection rod 601 is slidably connected to the second flip plate 302, a second end of the second connection rod 601 is fixedly connected to the second drive synchronization shaft 602, the second drive gear 603 is sleeved on the second drive synchronization shaft 602 and is fixedly connected to the second drive synchronization shaft 602, and the second drive synchronization shaft 602 is further rotatably connected to the support base 100. The first drive gear 503 is engaged with the second drive gear 603.

In some embodiments, in the case that the external force is applied to the first flip plate 202, and the first flip plate 202 flips in the counterclockwise direction, the first flip plate 202 drives the first connection rod 501 to rotate in the counterclockwise direction. Then, the first connection rod 501 drives the first drive synchronization shaft 502 to rotate in the counterclockwise direction, and the first drive synchronization shaft 502 drives the first drive gear 503 to rotate in the counterclockwise direction. Then, the first drive gear 503 drives the second drive gear 603 to rotate in the clockwise direction, the second drive gear 603 drives the second drive synchronization shaft 602 to rotate in the clockwise direction, the second drive synchronization shaft 602 drives the second connection rod 601 to rotate in the clockwise direction, the second connection rod 601 drives the second flip plate 302 to flip in the clockwise direction, and the second flip plate 302 drives the second swing arm 301 to flip in the clockwise direction. As such, the synchronous flip of the first flip assembly 200 and the second flip assembly 300 is achieved by the first synchronization assembly 500 and the second synchronization assembly 600.

In some embodiments, one set of the at least one set of synchronization assemblies further include a plurality of driven gears disposed between the first drive gear 503 and the second drive gear 603. A number of the plurality of driven gears is an even number, the plurality of driven gears are sequentially engaged, and the plurality of driven gears are respectively engaged with the first drive gear 503 and the second drive gear 603. In some embodiments, the number of the plurality of driven gears between the first drive gear 503 and the second drive gear 603 is two. It should be noted that in the embodiments of the present disclosure, the driven gears of other number are set as requirements, which is not limited in the embodiments of the present disclosure. As shown in FIG. 8, in the case that the number of the driven gears is two, the two driven gears includes a first driven gear 504 and a second driven gear 604. The first driven gear 504 is engaged with the first drive gear 503, and the second driven gear 604 is engaged with the second drive gear 603, and the first driven gear 504 is engaged with the second driven gear 604.

In some embodiments, in the case that the external force is applied to the first flip plate 202, and the first flip plate 202 flips in the counterclockwise direction, the first flip plate 202 drives the first connection rod 501 to rotate in the counterclockwise direction. Then, the first connection rod 501 drives the first drive synchronization shaft 502 to rotate in the counterclockwise direction, and the first drive synchronization shaft 502 drives the first drive gear 503 to rotate in the counterclockwise direction. Then, the first drive gear 503 drives the first driven gear 504 to rotate in the clockwise direction, the first driven gear 504 drives the second driven gear 604 to rotate in the counterclockwise direction, the second driven gear 604 drives the second drive gear 603 to rotate in the clockwise direction, the second drive gear 603 drives the second drive synchronization shaft 602 to rotate in the clockwise direction, the second drive synchronization shaft 602 drives the second connection rod 601 to rotate in the clockwise direction, the second connection rod 601 drives the second flip plate 302 to flip in the clockwise direction, and the second flip plate 302 drives the second swing arm 301 to flip in the clockwise direction. As such, the synchronous flip of the first flip assembly 200 and the second flip assembly 300 is achieved by the first synchronization assembly 500 and the second synchronization assembly 600.

In the embodiments of the present disclosure, one set of synchronization assemblies further includes a first auxiliary synchronization shaft 505 and a second auxiliary synchronization shaft 605 that are disposed between the first drive synchronization shaft 502 and the second drive synchronization shaft 602. The first driven gear 504 is sleeved on the first auxiliary synchronization shaft 505 and is fixedly connected to the first auxiliary synchronization shaft 505, and the second driven gear 604 is sleeved on the second auxiliary synchronization shaft 605 and is fixedly connected to the second auxiliary synchronization shaft 605. As such, the first auxiliary synchronization shaft 505 supports the first driven gear 504, and thus the stability of the first driven gear 504 in rotating is improved. The second auxiliary synchronization shaft 605 supports the second driven gear 604, and thus the stability of the second driven gear 604 in rotating is improved.

In some embodiments, as shown in FIG. 8, the support base 100 in the hinge further includes: a second support 102. The second support 102 is disposed on a side of the first support 101, and is provided with a third through hole c1 and a fourth through hole c2. The first connection rod 501 is closer to the first support 101 with respect to the second support 102, the first drive synchronization shaft 502 passes through the third through hole c1 in the second support 102, and an end portion, outside the second support 102, of the first drive synchronization shaft 502 is fixedly connected to the first connection rod 501. The second connection rod 601 is closer to the first support 101 with respect to the second support 102, the second drive synchronization shaft 602 passes through the fourth through hole c2, and an end portion, outside the second support 102, of the second drive synchronization shaft 602 is fixedly connected to the second connection rod 601. It should be noted that in the case that one set of synchronization assemblies include the first auxiliary synchronization shaft 505 and the second auxiliary synchronization shaft 605, the second support 102 further includes a first limit hole c3 and a second limit hole c4 that are disposed between the third through hole c1 and the fourth through hole c2. An end portion of the first auxiliary synchronization shaft 505 is within the first limit hole c3 and is rotatably connected to the first limit hole c3, an end portion of the second auxiliary synchronization shaft 605 is within the second limit hole c4 and is rotatably connected to the second limit hole c4. In this case, the first drive synchronization shaft 502, the second drive synchronization shaft 602, the first auxiliary synchronization shaft 505, and the second auxiliary synchronization shaft 605 are supported by the second support 102.

In the embodiments of the present disclosure, as shown in FIG. 7, the rear face of the first flip plate 202 in the first flip assembly 200 is provided with a first slide member 2022. The first slide member 2022 is provided with a slide slot b1, and the first connection rod 501 is in clearance fit with the slide slot b1 on the first slide member 2022. The rear face of the second flip plate 302 in the second flip assembly 300 is provided with a second slide member 3022. The second slide member 3022 is provided with a slide slot b1, and the second connection rod 601 is in clearance fit with the slide slot b1 on the second slide member 3022. In this case, the relative slide of the first flip plate 202 and the first connection rod 501 in flipping is achieved by the clearance fit of the first connection rod 501 and the slide slot b1 on the first slide member 2022, and the relative slide of the second flip plate 302 and the second connection rod 601 in flipping is achieved by the clearance fit of the second connection rod 601 and the slide slot b1 on the second slide member 3022.

In some embodiments, as shown in FIG. 8, the hinge includes at least two sets of synchronization assemblies. The at least two sets of synchronization assemblies are in one to one correspondence to the at least one set of flip assemblies, and two sets of synchronization assemblies corresponding to one set of flip assemblies are respectively disposed on two sides of the one set of flip assemblies. For example, the hinge includes two sets of synchronization assemblies, and the two sets of synchronization assemblies are uniformly arranged in the length direction of the support base 100. As such, a precision of the synchronous flip of the first flip assembly 200 and the second flip assembly 300 by the synchronization assembly is efficiently achieved.

Figure 9:
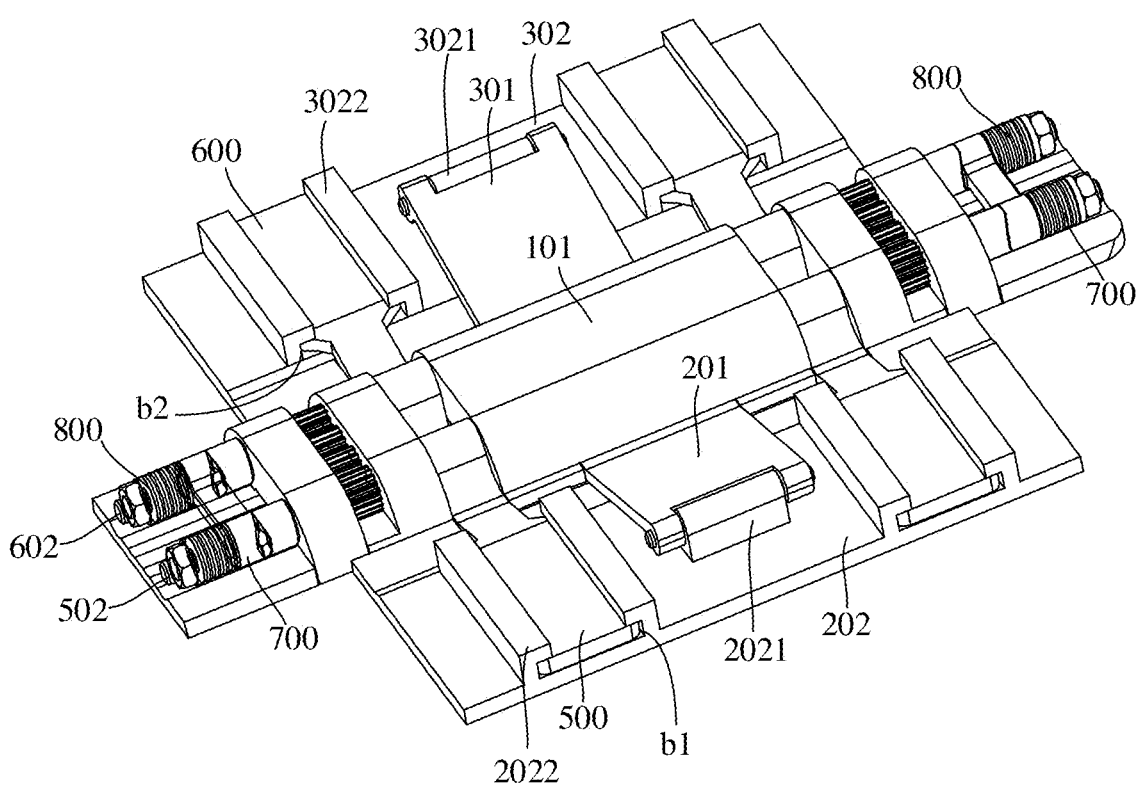
FIG. 9 is a schematic structural diagram of another hinge according to some embodiments of the present disclosure.
Figure 10:
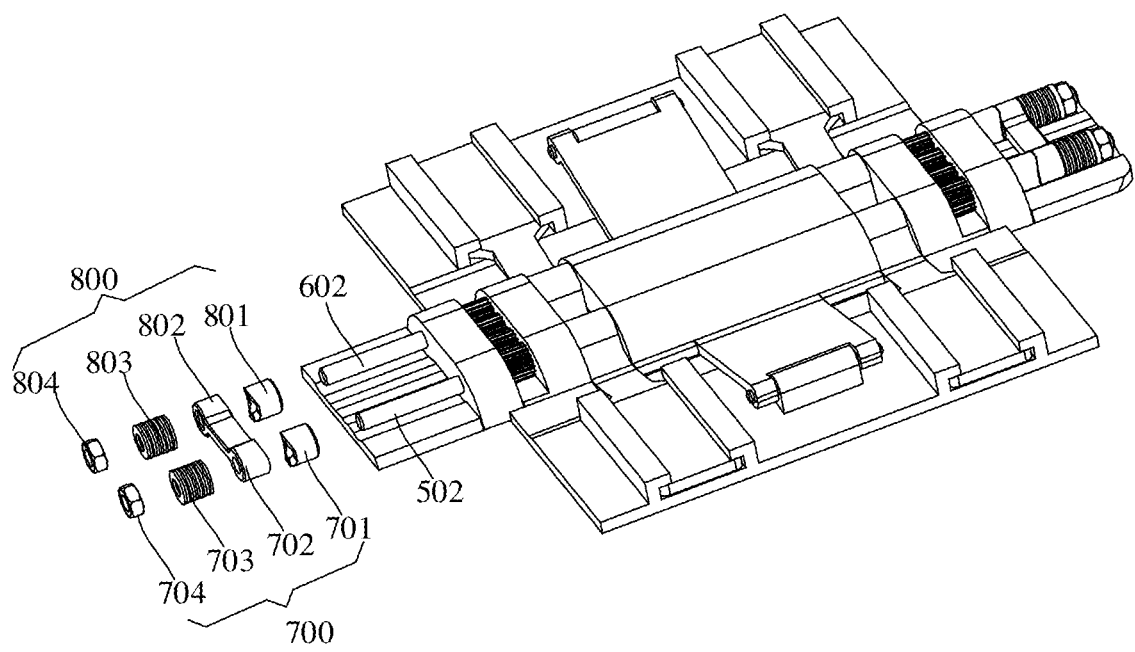
FIG. 10 is an explosive diagram of the hinge shown in FIG. 9.

In practical application, in folding or unfolding the hinge, in the embodiments of the present disclosure, the hinge, for the damping effect or self-hovering ability, further includes: at least one set of torsion assemblies. The at least one set of torsion assemblies are in one to one correspondence to the at least one set of synchronization assemblies. Referring to FIG. 9 and FIG. 10, FIG. 9 is a schematic structural diagram of another hinge according to some embodiments of the present disclosure, and FIG. 10 is an explosive diagram of the hinge shown in FIG. 9. One set of the at least one set of torsion assemblies include a first torsion assembly 700 and a second torsion assembly 800 that are respectively connected to the first drive synchronization shaft 502 and the second drive synchronization shaft 602 in corresponding one set of synchronization assemblies. The first torsion assembly 700 and the second torsion assembly 800 are configured to provide a damping force in the case that the first flip assembly 200 and the second flip assembly 300 flip.

In the embodiments of the present disclosure, the first torsion assembly 700 in one set of torsion assemblies is disposed on a side, facing away from the first connection rod 501, of the first drive gear 503. As shown in FIG. 10, the first torsion assembly 700 includes a first movable cam 701, a first fixed cam 702, a first elastic member 703, and a first lock member 704 that are sleeved on the first drive synchronization shaft 502. The first movable cam 701 is fixedly connected to the first drive synchronization shaft 502, the first fixed cam 702 is disposed on a side, facing away from the first drive gear 503, of the first movable cam 701 and is rotatably connected to the first drive synchronization shaft 502, the first lock member 704 is disposed on a side, facing away from the first movable cam 701, of the first fixed cam 702 and is fixedly connected to the first drive synchronization shaft 502, and the first elastic member 703 is disposed between the first fixed cam 702 and the first lock member 704.

The second torsion assembly 800 in one set of torsion assemblies is disposed on a side, facing away from the second connection rod 601, of the second drive gear 603. The second torsion assembly 800 includes a second movable cam 801, a second fixed cam 802, a second elastic member 803, and a second lock member 804 that are sleeved on the second drive synchronization shaft 602. The second movable cam 801 is fixedly connected to the second drive synchronization shaft 602, the second fixed cam 802 is disposed on a side, facing away from the second drive gear 603, of the second movable cam 801 and is rotatably connected to the second drive synchronization shaft 602, the second lock member 804 is disposed on a side, facing away from the second movable cam 801, of the second fixed cam 802 and is fixedly connected to the second drive synchronization shaft 602, and the second elastic member 803 is disposed between the second fixed cam 802 and the second lock member 803. The first fixed cam 702 is fixedly connected to the second fixed cam 802. The first drive synchronization shaft 502 drives the first movable cam 701 to rotate with respect to the first fixed cam 702, and the first elastic member 703 is compressed in the case that a protrusion of the first movable cam 701 tends to slide out from a recess of the first fixed cam 702. As such, a damping force is provided by the first torsion assembly 700. In the case that the protrusion of the first movable cam 701 is disposed with the recess of the first fixed cam 702, the first fixed cam 702 and the first movable cam 701 are static relative to each other by the first elastic member 703. As such, the self-hovering effect of the display device is achieved by the first torsion assembly 700.

In some embodiments, in the case that the hinge is in a fully unfolded state, a protrusion of the first fixed cam 702 (not shown in the drawings) is exactly within a recess of the first movable cam 701 (not shown in the drawings), such that the hinge keeps the specific angle, and the display device is not prone to being folded under the action of the external force in the case that the user touches or presses the flexible screen. In the case that the hinge is in a fully folded state, the protrusion of the first fixed cam 702 is exactly within the recess of the first movable cam 701, such that the hinge keeps the specific angle. Thus, the display device is not prone to being unfolded under the action of the external force in the case that the user touches or presses the flexible screen, and the safety of the display device is ensured. It should be noted that the movement principle of the second torsion assembly 800 is referred to the above related description of the first torsion assembly 700, which is not repeated herein.

In some embodiments, each of the first elastic member 703 and the second elastic member 803 includes a plurality of stacked disc springs. It should be noted that in some embodiments, each of the first elastic member 703 and the second elastic member 803 are a compression spring or leaf spring, which is not limited in the embodiments of the present disclosure.

Figure 11:
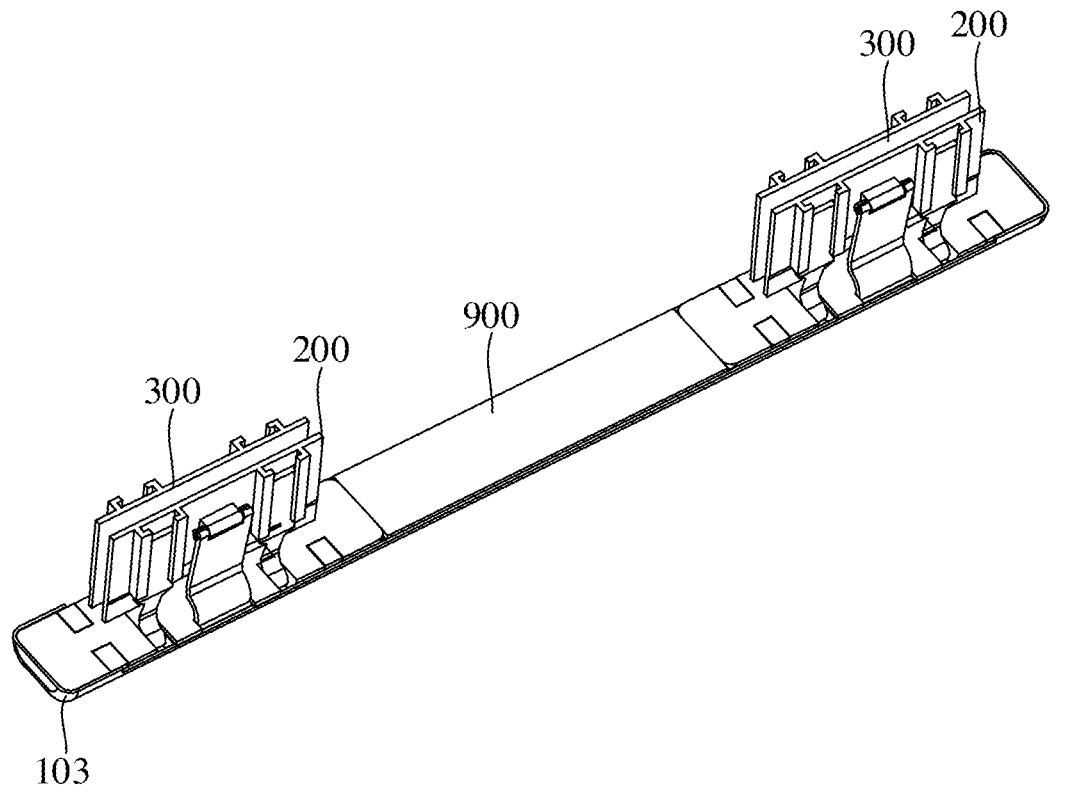
FIG. 11 is a schematic structural diagram of a hinge according to some embodiments of the present disclosure.

In the embodiments of the present disclosure, referring to FIG. 11, FIG. 11 is a schematic structural diagram of a hinge according to some embodiments of the present disclosure. The support base 100 in the hinge further includes a third support 103. The third support 103 is disposed on a side, facing away from the press plate 400, of the first support 101, and is provided with an accommodation cavity. The torsion assemblies, the synchronization assemblies, a portion in the first flip assembly 200, and a portion in the second flip assembly 300 in the hinge are all within the accommodation cavity of the third support 103. As such, the hinge is modified by the third support 103, and the appearance of the display device is improved.

In some embodiments, a number of sets of the flip assemblies in the hinge is two, and the two sets of the flip assemblies are arranged in the length direction of the third support 103. In the present disclosure, a support plate 900 is disposed between the two sets of the flip assemblies, and a center region of the flexible screen in the display device is supported by the support plate 900.

In summary, a hinge is provided in the embodiments of the present disclosure. The hinge includes: a support base and at least one set of flip assemblies. One set of flip assemblies include a first flip assembly and a second flip assembly that are symmetrically arranged with respect to the support base. In the case that the hinge is switched between the unfolded state and the folded state, a first flip plate is swingable around a second end of a first swing arm in flipping, such that an included angle between a rear face of the first flip plate and the first swing arm changes, and a length of a connection rod mechanism formed by the first flip plate and the first swing arm is extended or shortened with the change of the included angle between the rear face of the first flip plate and the first swing arm. Thus, in folding the flexible screen of the display device, the hinge basically does not squeeze or pull the flexible screen, such that a possibility of damaging the flexible screen by the hinge is reduced, and the service life of the flexible screen is effectively prolonged.

Figure 12:
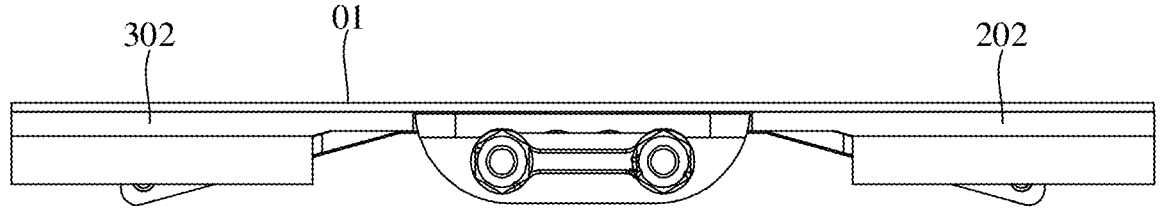
FIG. 12 is a partially schematic structural diagram of a display device according to some embodiments of the present disclosure.

In practical application, the hinge in the present disclosure is applicable to multiple display device of which the folding or unfolding function is achieved by the hinge. For example, a display device is further provided in the embodiments of the present disclosure. Referring to FIG. 12, FIG. 12 is a partially schematic structural diagram of a display device according to some embodiments of the present disclosure. The display device includes: a housing (not shown in the drawings), a flexible screen 01, and a hinge. The hinge is within the housing, an edge of the flexible screen 01 is connected to an edge of the housing, and a rear face of the flexible screen 01 is fitted with a front face of the first flip plate 202 of the hinge and a front face of the second flip plate 302 of the hinge.

In the present disclosure, the housing includes a first housing and a second housing, the first flip plate 202 is fixedly connected to the first housing, the second flip plate 302 is fixedly connected to the second housing, and thus the first housing is flipably connected to the second housing by the hinge. In practical application, a processor, a battery, a camera, and the like are within the first housing and the second housing. For example, the first housing is fixedly connected to the first flip plate 202 by a screw, welding, bonding or the like manner, and the second housing is fixedly connected to the second flip plate 302 by a screw, welding, bonding or the like manner. One portion of the flexible screen 01 of the display device is bonded to the first housing, and the other portion of the flexible screen 01 of the display device is bonded to the second housing, so as to support the flexible screen 01 by the housing.

Figure 13:
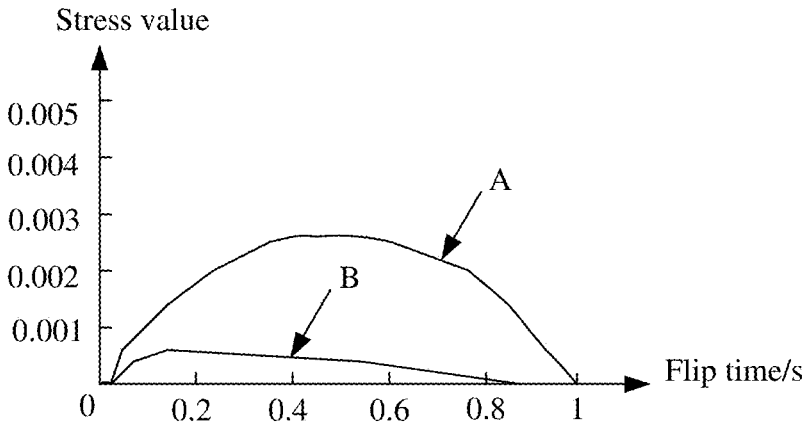
FIG. 13 is a schematic structural diagram of a force analysis of an inorganic layer in a flexible screen in folding according to some embodiments of the present disclosure.

In the present disclosure, the flexible screen using the hinge in some practice is folded, the flexible screen using the hinge in the embodiments of the present disclosure is folded, and the stress on the flexible screen in flipping is simulated and analyzed. For example, the stress on the inorganic layer of the flexible screen in folding is simulated and analyzed, and the results are shown in FIG. 13. FIG. 13 is a schematic structural diagram of a force analysis of an inorganic layer in a flexible screen in folding according to some embodiments of the present disclosure. Curve A represents a dynamic value of the stress on the inorganic layer as a flip time in the case that the flexible screen is folded using the hinge in some practices, and curve B represents a dynamic value of the stress on the inorganic layer as a flip time in the case that the flexible screen is folded using the hinge in the embodiments of the present disclosure. It can be seen from FIG. 13 that, a maximum stress on the inorganic layer is about 0.0027 in the case that the flexible screen is folded using the hinge in some practices, and a maximum stress on the inorganic layer is about 0.0005 in the case that the flexible screen is folded using the hinge in the embodiments of the present disclosure.

Figure 14:
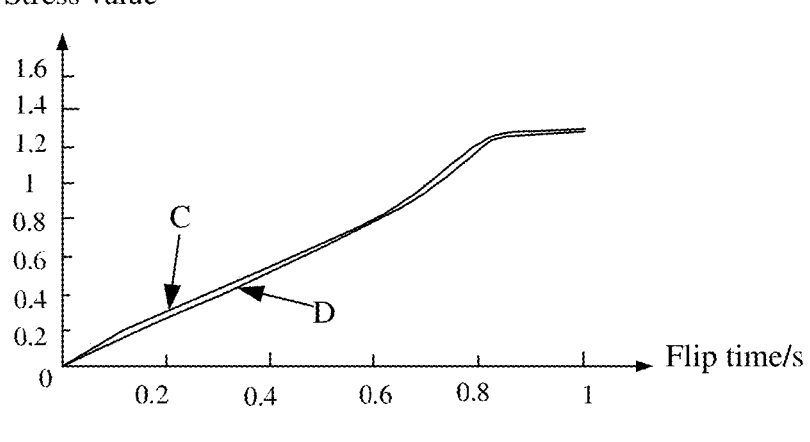
FIG. 14 is a schematic structural diagram of a force analysis of an adhesive layer in a flexible screen in folding according to some embodiments of the present disclosure.

The stress on an adhesive layer of the flexible screen in folding is simulated and analyzed, and the results are shown in FIG. 14. FIG. 14 is a schematic structural diagram of a force analysis of an adhesive layer in a flexible screen in folding according to some embodiments of the present disclosure. Curve C represents a dynamic value of the stress on the adhesive layer of the flexible screen as a flip time in the case that the flexible screen is folded using the hinge in some practices, and curve B represents a dynamic value of the stress on the adhesive layer as a flip time in the case that the flexible screen is folded using the hinge in the embodiments of the present disclosure. It can be seen from FIG. 14 that, a maximum stress on the adhesive layer is about 1.3 in the case that the flexible screen is folded using the hinge in some practices, and a maximum stress on the adhesive layer is also about 1.3 in the case that the flexible screen is folded using the hinge in the embodiments of the present disclosure. Based on above description, in the case that the flexible screen is folded using the hinge in the present disclosure, the stress on the inorganic layer of the flexible screen is efficiently reduced, such that a possibility of damaging the flexible screen by the hinge is reduced, and the service life of the flexible screen is effectively prolonged.

In the present disclosure, the terms "first" and "second" are used to descriptive purposes, and are not construed to indicate or imply relative importance. Unless expressly limited otherwise, the term "a plurality of" refers to two or more.

Described above are merely some optional embodiments of the present disclosure, and are not intended to limit the present disclosure. Any modifications, equivalents, improvements, and the like, within the spirit and principle of the present disclosure, are intended to be included within the scope of the present disclosure.

The invention claimed is:

1. A hinge, comprising: a support base and at least one set of flip assemblies, wherein one set of flip assemblies comprise a first flip assembly and a second flip assembly that are symmetrically arranged with respect to the support base: wherein the first flip assembly comprises a first swing arm and a first flip plate, wherein a first end of the first swing arm is flipably connected to the support base, and a second end of the first swing arm is directly flipably connected to a rear face of the first flip plate; and the second flip assembly comprises a second swing arm and a second flip plate, wherein a first end of the second swing arm is flipably connected to the support base, and a second end of the second swing arm is directly flipably connected to a rear face of the second flip plate; wherein a front face of the first flip plate is coplanar with a front face of the second flip plate in the case that the hinge is in an unfolded state, and the front face of the first flip plate is opposite and parallel to the front face of the second flip plate in the case that the hinge is in a folded state; and in the case that the hinge is switched between the unfolded state and the folded state, the first flip plate flips about the support base through the first swing arm, the first flip plate is swingable about the second end of the first swing arm, the second flip plate flips about the support base through the second swing arm, and the second flip plate is swingable about the second end of the second swing arm; and the front face of the first flip plate and the front face of the second flip plate are configured to support a screen, and each of the first flip plate and the second flip plate consists of a single component.

2. The hinge according to claim 1, wherein a maximum angle of the first flip plate swinging about the second end of the first swing arm and a maximum angle of the second flip plate swinging about the second end of the second swing arm both range from 6 degrees to 13 degrees.

3. The hinge according to claim 1, wherein
the rear face of the first flip plate is provided with a first connector having a first through hole therein, and the second end of the first swing arm is provided with a first pin shaft, wherein a portion of the first pin shaft is within the first through hole and is rotatably connected to the first connector; and
the rear face of the second flip plate is provided with a second connector having a second through hole therein, and the second end of the second swing arm is provided with a second pin shaft, wherein a portion of the second pin shaft is within the second through hole and is rotatably connected to the second connector.

4. The hinge according to claim 1, wherein the support base comprises: a first support, wherein the first support is provided with a first arc slide slot and a second arc slide slot, wherein
the first end of the first swing arm is provided with a first arc rail, wherein the first arc rail is within the first arc slide slot and is rotatably connected to the first support; and
the first end of the second swing arm is provided with a second arc rail, wherein the second arc rail is within the second arc slide slot and is rotatably connected to the first support.

5. The hinge according to claim 4, wherein the one set of flip assemblies further comprise a press plate, wherein the press plat is fixedly connected to a side, on which the first arc slide slot and the second arc slide slot are disposed, of the first support, and a face, facing away from the first support, of the press plate is coplanar with the front face of the first flip plate and the front face of the second flip plate in the case that the hinge is in the unfolded state.

6. The hinge according to claim 1, wherein the hinge further comprises: at least one set of synchronization assemblies, wherein one set of synchronization assemblies comprise a first synchronization assembly and a second synchronization assembly that are symmetrically arranged with respect to the support base;
wherein the first synchronization assembly is connected to the first flip assembly, the second synchronization assembly is connected to the second flip assembly, the first synchronization assembly is connected to the second synchronization assembly, and the first synchronization assembly and the second synchronization assembly are configured to drive the first flip assembly and the second flip assembly to flip synchronously.

7. The hinge according to claim 6, wherein
the first synchronization assembly comprises: a first connection rod, a first drive synchronization shaft, and a first drive gear, wherein a first end of the first connection rod is slidably connected to the first flip plate, a second end of the first connection rod is fixedly connected to the first drive synchronization shaft, the first drive gear is sleeved on the first drive synchronization shaft and is fixedly connected to the first drive synchronization shaft, and the first drive synchronization shaft is further rotatably connected to the support base; and
the second synchronization assembly comprises: a second connection rod, a second drive synchronization shaft, and a second drive gear, wherein a first end of the second connection rod is slidably connected to the second flip plate, a second end of the second connection rod is fixedly connected to the second drive synchronization shaft, the second drive gear is sleeved on the second drive synchronization shaft and is fixedly connected to the second drive synchronization shaft, and the second drive synchronization shaft is further rotatably connected to the support base;
wherein the first drive gear is engaged with the second drive gear.

8. The hinge according to claim 7, wherein
the rear face of the first flip plate is provided with a first slide member, wherein the first slide member has a slide slot therein, the first connection rod being in clearance fit with the slide slot; and the rear face of the second flip plate is provided with a second slide member, wherein the second slide member has a slide slot therein, the second connection rod being in clearance fit with the slide slot.

9. The hinge according to claim 7, wherein the one set of synchronization assemblies further comprise a plurality of driven gears disposed between the first drive gear and the second drive gear, wherein a number of the plurality of driven gears is an even number, the plurality of driven gears are sequentially engaged, and the plurality of driven gears are respectively engaged with the first drive gear and the second drive gear.

10. The hinge according to claim 7, wherein the support base further comprises: a second support provided with a third through hole and a fourth through hole, wherein the first drive synchronization shaft passes through the third through hole, is disposed on an end portion outside the second support, and is fixedly connected to the first connection rod; and the second drive synchronization shaft passes through the fourth through hole, is disposed on an end portion outside the second support, and is fixedly connected to the second connection rod.

11. The hinge according to claim 7, wherein the hinge further comprises at least one set of torsion assemblies, wherein the at least one set of torsion assemblies are in one to one correspondence to the at least one set of synchronization assemblies, and one set of torsion assemblies comprise a first torsion assembly and a second torsion assembly that are respectively connected to the first drive synchronization shaft and the second drive synchronization shaft in corresponding one set of synchronization assemblies, wherein the first torsion assembly and the second torsion assembly are configured to provide a damping force in the case that the first flip assembly and the second flip assembly flip.

12. The hinge according to claim 11, wherein
the first torsion assembly is disposed on a side, facing away from the first connection rod, of the first drive gear, and the first torsion assembly comprises a first movable cam, a first fixed cam, a first elastic member, and a first lock member that are sleeved on the first drive synchronization shaft, wherein the first movable cam is fixedly connected to the first drive synchronization shaft, the first fixed cam is disposed on a side, facing away from the first drive gear, of the first movable cam and is rotatably connected to the first drive synchronization shaft, the first lock member is disposed on a side, facing away from the first movable cam, of the first fixed cam and is fixedly connected to the first drive synchronization shaft, and the first elastic member is disposed between the first fixed cam and the first lock member; and
the second torsion assembly is disposed on a side, facing away from the second connection rod, of the second drive gear, and the second torsion assembly comprises a second movable cam, a second fixed cam, a second elastic member, and a second lock member that are sleeved on the second drive synchronization shaft, wherein the second movable cam is fixedly connected to the second drive synchronization shaft, the second fixed cam is disposed on a side, facing away from the second drive gear, of the second movable cam and is rotatably connected to the second drive synchronization shaft, the second lock member is disposed on a side, facing away from the second movable cam, of the second fixed cam and is fixedly connected to the second drive synchronization shaft, and the second elastic member is disposed between the second fixed cam and the second lock member;
wherein the first fixed cam is fixedly connected to the second fixed cam.

13. The hinge according to claim 12, wherein each of the first elastic member and the second elastic member comprises a plurality of stacked disc springs.

14. The hinge according to claim 6, wherein the hinge comprises at least two sets of synchronization assemblies, wherein the at least two sets of synchronization assemblies are in one to one correspondence to the at least one set of flip assemblies, and two sets of synchronization assemblies corresponding to one set of flip assemblies are respectively disposed on two sides of the one set of flip assemblies.

15. The hinge according to claim 6, wherein the hinge comprises two sets of synchronization assemblies, wherein the two sets of synchronization assemblies are uniformly arranged in a length direction of the support base.

16. A display device, comprising: a housing, a flexible screen, and a hinge, wherein the hinge comprises: a support base and at least one set of flip assemblies, wherein one set of flip assemblies comprise a first flip assembly and a second flip assembly that are symmetrically arranged with respect to the support base; wherein the first flip assembly comprises a first swing arm and a first flip plate, wherein a first end of the first swing arm is flipably connected to the support base, and a second end of the first swing arm is directly flipably connected to a rear face of the first flip plate; and the second flip assembly comprises a second swing arm and a second flip plate, wherein a first end of the second swing arm is flipably connected to the support base, and a second end of the second swing arm is directly flipably connected to a rear face of the second flip plate; wherein a front face of the first flip plate is coplanar with a front face of the second flip plate in the case that the hinge is in an unfolded state, and the front face of the first flip plate is opposite and parallel to the front face of the second flip plate in the case that the hinge is in a folded state; and in the case that the hinge is switched between the unfolded state and the folded state, the first flip plate flips about the support base through the first swing arm, the first flip plate is swingable about the second end of the first swing arm, the second flip plate flips about the support base through the second swing arm, and the second flip plate is swingable about the second end of the second swing arm; and the hinge is disposed within the housing, an edge of the flexible screen is connected to an edge of the housing, and a rear face of the flexible screen is fitted with the front face of the first flip plate of the hinge and the front face of the second flip plate of the hinge; wherein each of the first flip plate and the second flip plate consists of a single component.

17. The display device according to claim 16, wherein a maximum angle of the first flip plate swinging about the second end of the first swing arm and a maximum angle of the second flip plate swinging about the second end of the second swing arm both range from 6 degrees to 13 degrees.

18. The display device according to claim 16, wherein
the rear face of the first flip plate is provided with a first connector having a first through hole therein, and the second end of the first swing arm is provided with a first pin shaft, wherein a portion of the first pin shaft is within the first through hole and is rotatably connected to the first connector; and
the rear face of the second flip plate is provided with a second connector having a second through hole therein, and the second end of the second swing arm is provided with a second pin shaft, wherein a portion of the second pin shaft is within the second through hole and is rotatably connected to the second connector.

19. The display device according to claim 16, wherein the support base comprises: a first support, wherein the first support is provided with a first are slide slot and a second arc slide slot, wherein the first end of the first swing arm is provided with a first arc rail, wherein the first are rail is within the first arc slide slot and is rotatably connected to the first support; and the first end of the second swing arm is provided with a second arc rail, wherein the second arc rail is within the second are slide slot and is rotatably connected to the first support.

20. The display device according to claim 19, wherein the one set of flip assemblies further comprise a press plate, wherein the press plat is fixedly connected to a side, on which the first arc slide slot and the second arc slide slot are disposed, of the first support, and a face, facing away from the first support, of the press plate is coplanar with the front face of the first flip plate and the front face of the second flip plate in the case that the hinge is in the unfolded state.

\*   \*   \*   \*   \*